United States Patent [19]

Ingermann et al.

[11] Patent Number: 5,331,810
[45] Date of Patent: Jul. 26, 1994

[54] LOW THERMAL CAPACITANCE EXHAUST SYSTEM FOR AN INTERNAL COMBUSTION ENGINE

[75] Inventors: Keith C. Ingermann; Robert T. Usleman, both of Columbus, Ind.

[73] Assignee: Arvin Industries, Inc., Columbus, Ind.

[21] Appl. No.: 886,963

[22] Filed: May 21, 1992

[51] Int. Cl.⁵ .............................. F01N 7/10; F01N 7/14
[52] U.S. Cl. ........................................ 60/322; 60/272; 60/282; 60/299; 60/323
[58] Field of Search ................ 60/272, 299, 322, 323, 60/282

[56] References Cited

U.S. PATENT DOCUMENTS

| | | |
|---|---|---|
| 3,159,239 | 12/1964 | Andrews . |
| 3,227,241 | 1/1966 | Mattoon . |
| 3,313,536 | 4/1967 | Dutton et al. . |
| 3,523,590 | 8/1970 | Straw . |
| 3,850,453 | 11/1974 | Bentley ............................ 60/322 |
| 3,864,909 | 2/1975 | Kern ................................ 60/322 |
| 3,916,850 | 11/1975 | Date et al. . |
| 3,990,859 | 11/1976 | Waite . |
| 4,020,539 | 5/1977 | Vroman . |
| 4,022,019 | 5/1977 | Garcea . |
| 4,048,363 | 9/1977 | Langer et al. . |
| 4,087,039 | 5/1978 | Balluff . |
| 4,155,980 | 5/1979 | Santiago et al. . |
| 4,256,700 | 3/1981 | Smith et al. . |
| 4,343,074 | 8/1982 | Bailey et al. . |
| 4,344,922 | 8/1982 | Santiago et al. . |
| 4,345,430 | 8/1982 | Pallo .................................... 60/299 |
| 4,347,219 | 8/1982 | Noritake et al. . |
| 4,362,700 | 12/1982 | Hayashi et al. . |
| 4,413,392 | 11/1983 | Otani et al. . |
| 4,475,341 | 10/1984 | Inoue .................................. 60/322 |
| 4,501,302 | 2/1985 | Harwood . |
| 4,504,294 | 3/1985 | Brighton . |
| 4,519,120 | 5/1985 | Nonnenmann et al. . |
| 4,556,543 | 12/1985 | Mochida et al. . |
| 4,590,652 | 5/1986 | Harwood . |
| 4,629,605 | 12/1986 | Santiago . |
| 4,662,173 | 5/1987 | Wilkinson . |
| 4,731,993 | 3/1988 | Ito et al. . |
| 4,880,259 | 11/1989 | Doerge et al. . |
| 4,969,264 | 11/1990 | Dryer et al. . |
| 5,004,018 | 4/1991 | Bainbridge . |
| 5,011,194 | 4/1991 | Nitta . |
| 5,018,661 | 5/1991 | Cyb . |
| 5,024,289 | 6/1991 | Merry . |
| 5,031,401 | 7/1991 | Hinderks . |
| 5,055,274 | 10/1991 | Abbott . |
| 5,056,832 | 10/1991 | Nagagawa et al. . |
| 5,058,380 | 10/1991 | Pelters et al. . |
| 5,118,476 | 6/1992 | Dryer et al. . |
| 5,163,289 | 11/1992 | Bainbridge ............................ 60/299 |

FOREIGN PATENT DOCUMENTS

| | | |
|---|---|---|
| 0243951 | 11/1987 | European Pat. Off. . |
| 3721608 | 1/1989 | Fed. Rep. of Germany ........ 60/322 |
| 2207615 | 2/1989 | United Kingdom . |

OTHER PUBLICATIONS

"The Development of Lightweight and Low-heat-capacity Exhaust Manifolds", Fukae, SAE Technical Paper Series 910303, pp. 1–6, Feb. 25–Mar. 1, 1991.

"Air Injection to an Electrically-Heated Catalyst for Reducing Cold-Start Benzene Emissions from Gasoline Vehicles", Heimrich, SAE Technical Paper Series 902115, pp. 1–15, Oct. 22–25, 1990.

Primary Examiner—Douglas Hart
Attorney, Agent, or Firm—Barnes & Thornburg

[57] ABSTRACT

A low thermal capacitance exhaust pipe has a plurality of sections connected by an expansion joint to relieve thermal stress.

21 Claims, 9 Drawing Sheets

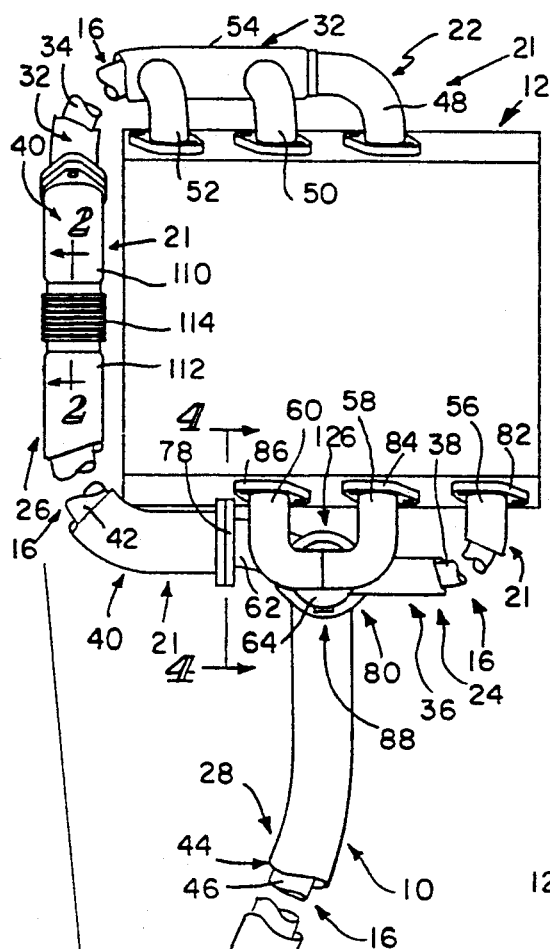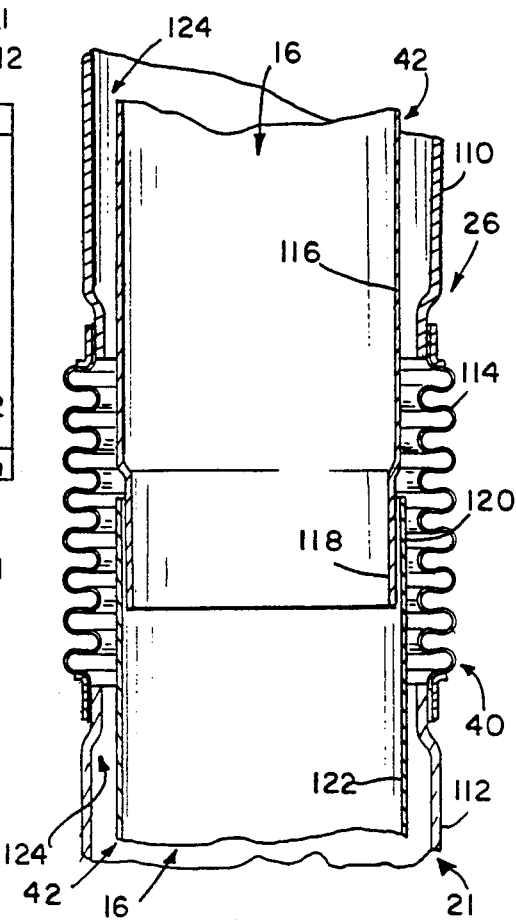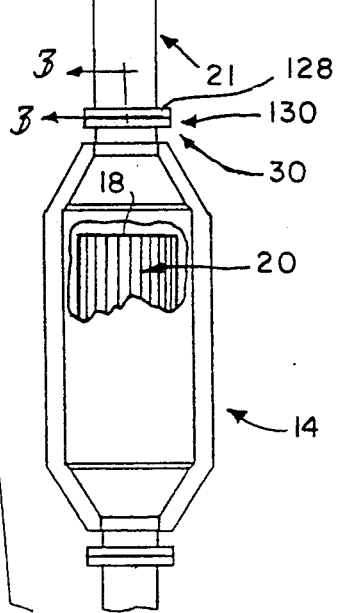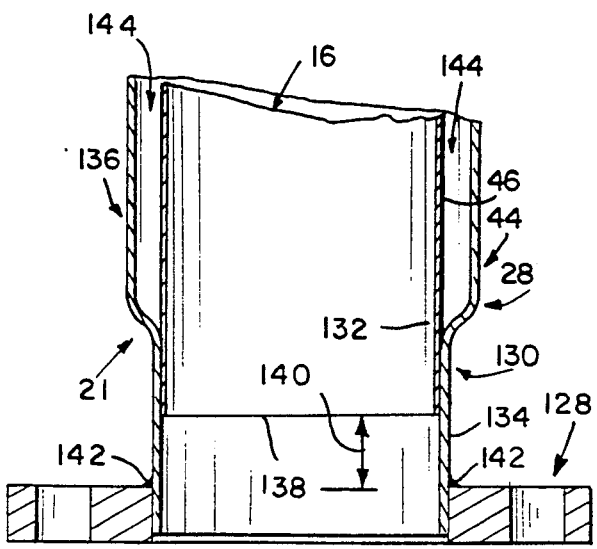
FIG. 1
FIG. 2
FIG. 3

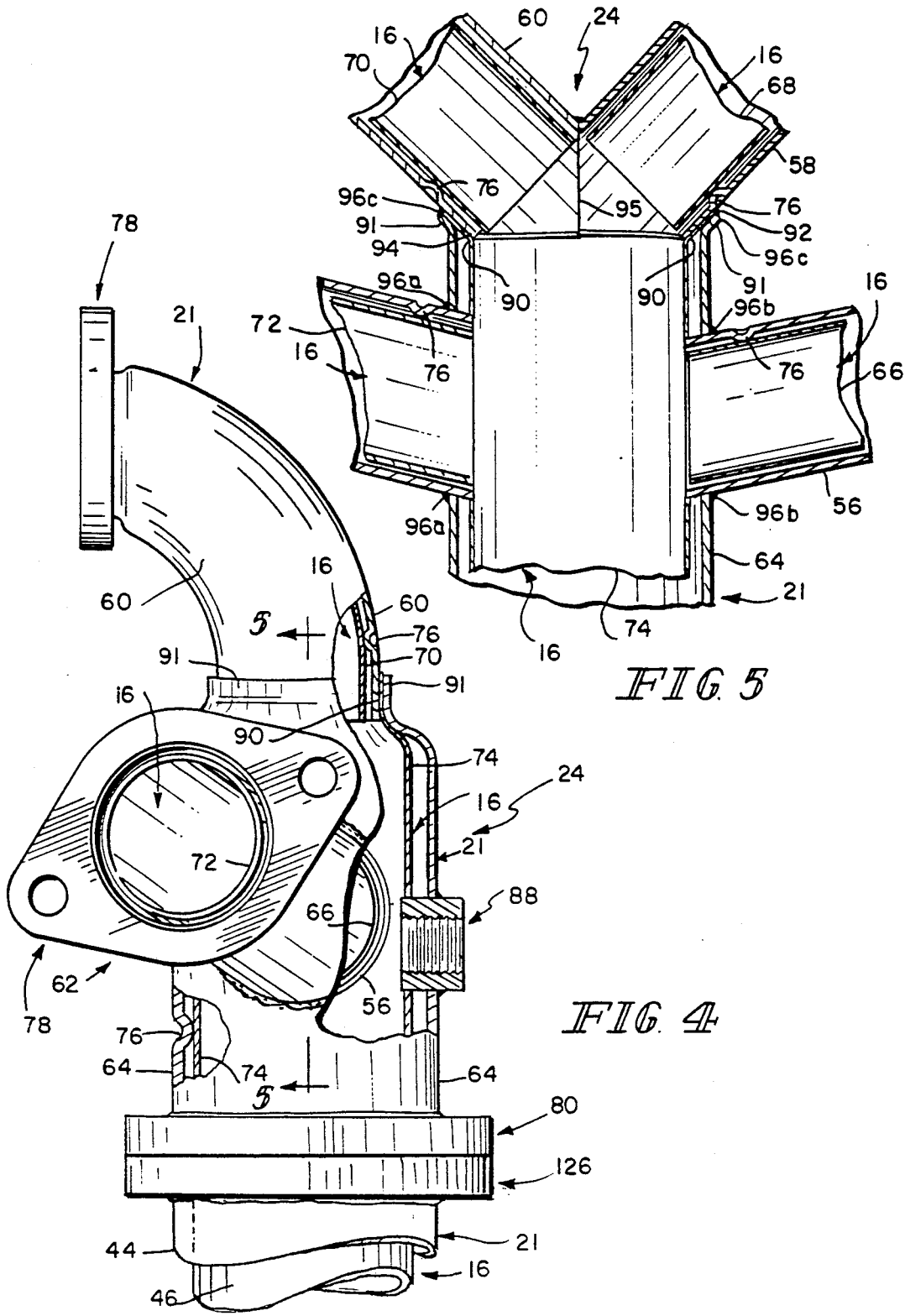

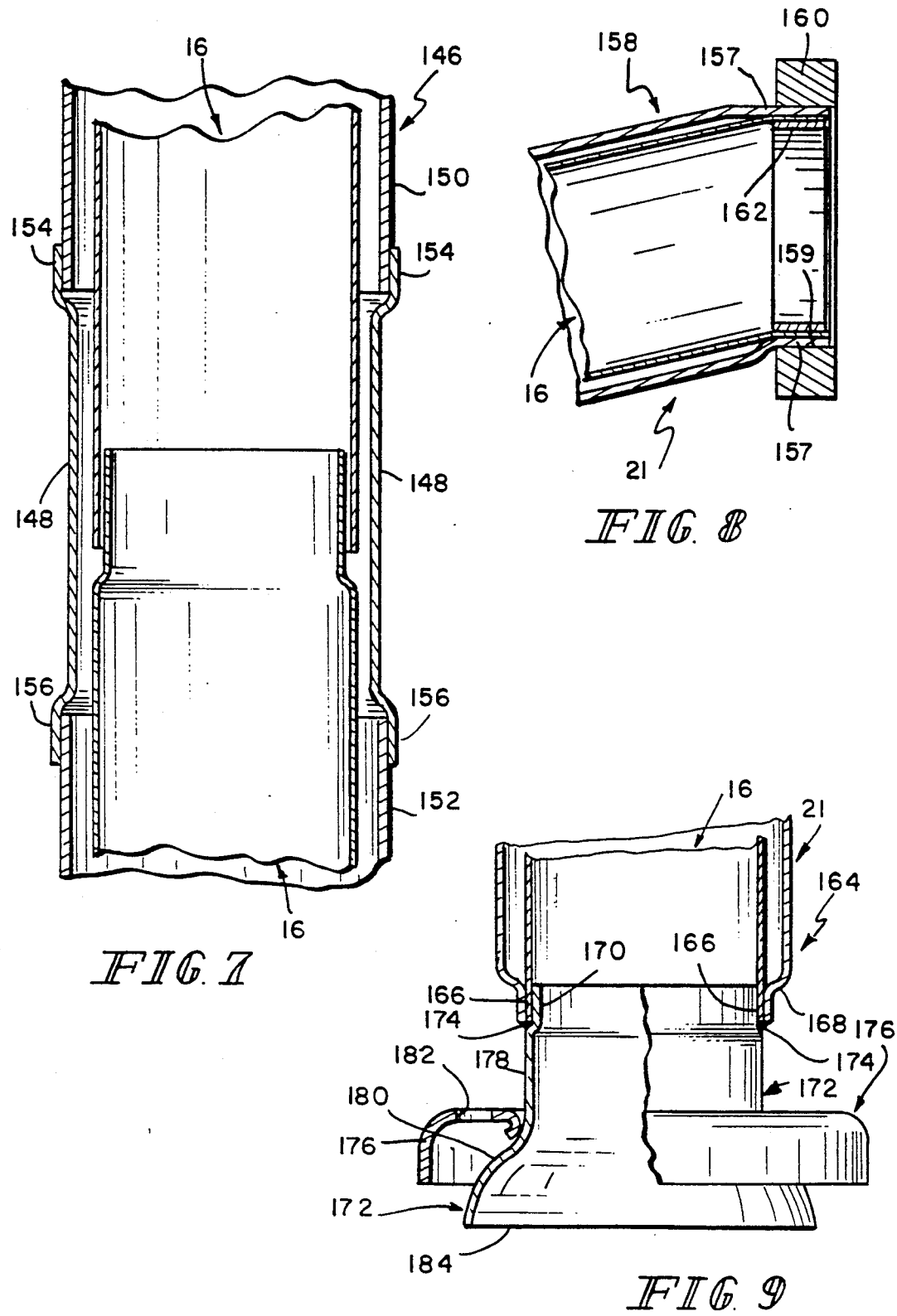

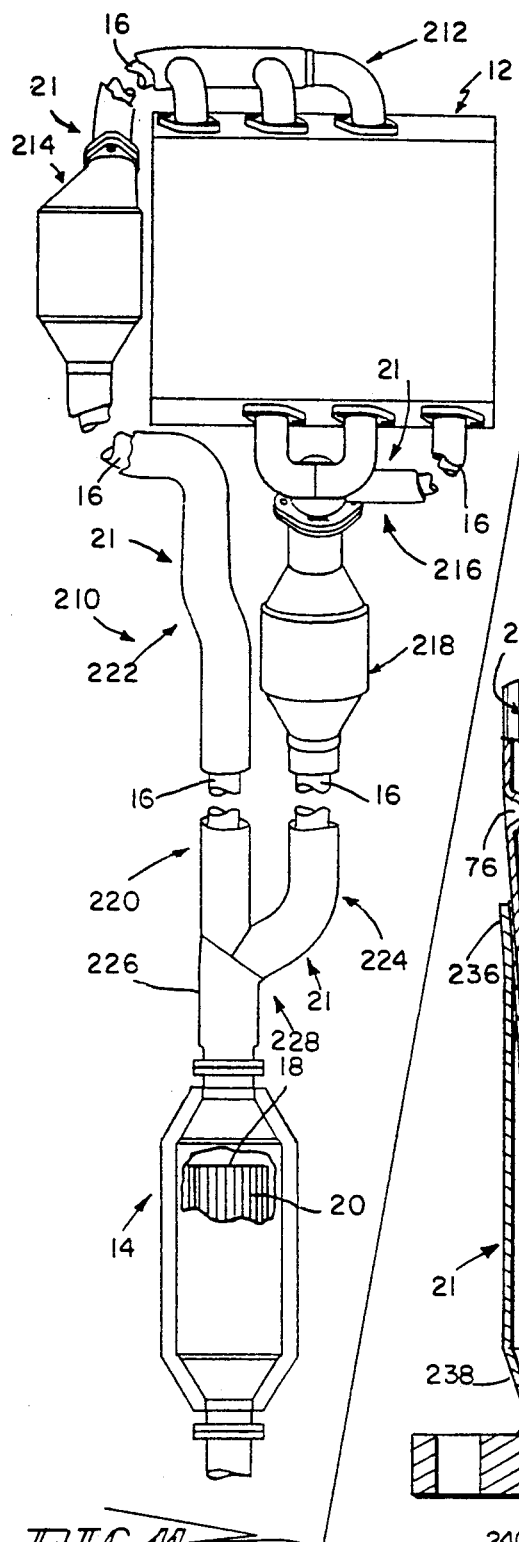
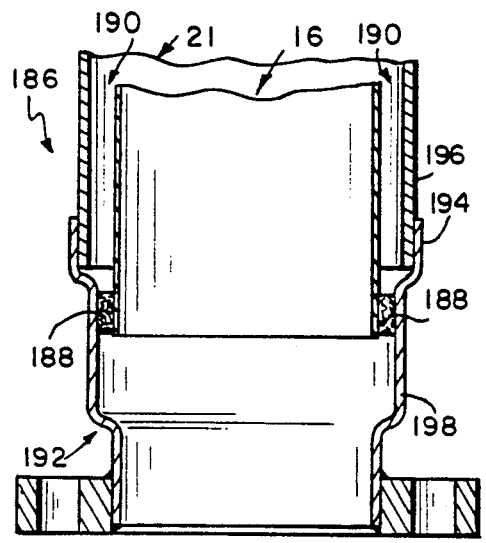
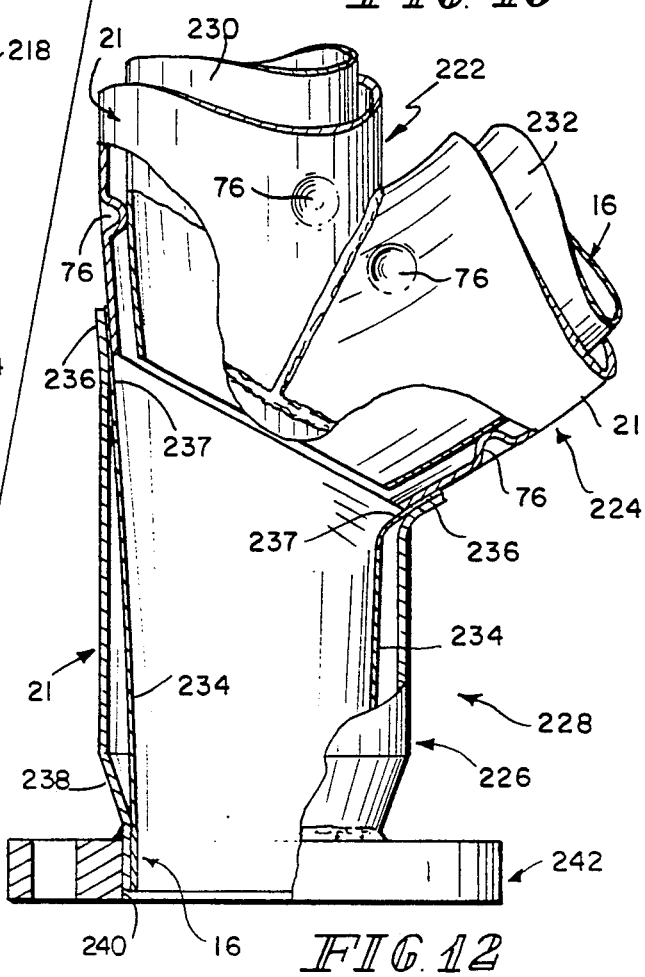
FIG. 10
FIG. 11
FIG. 12

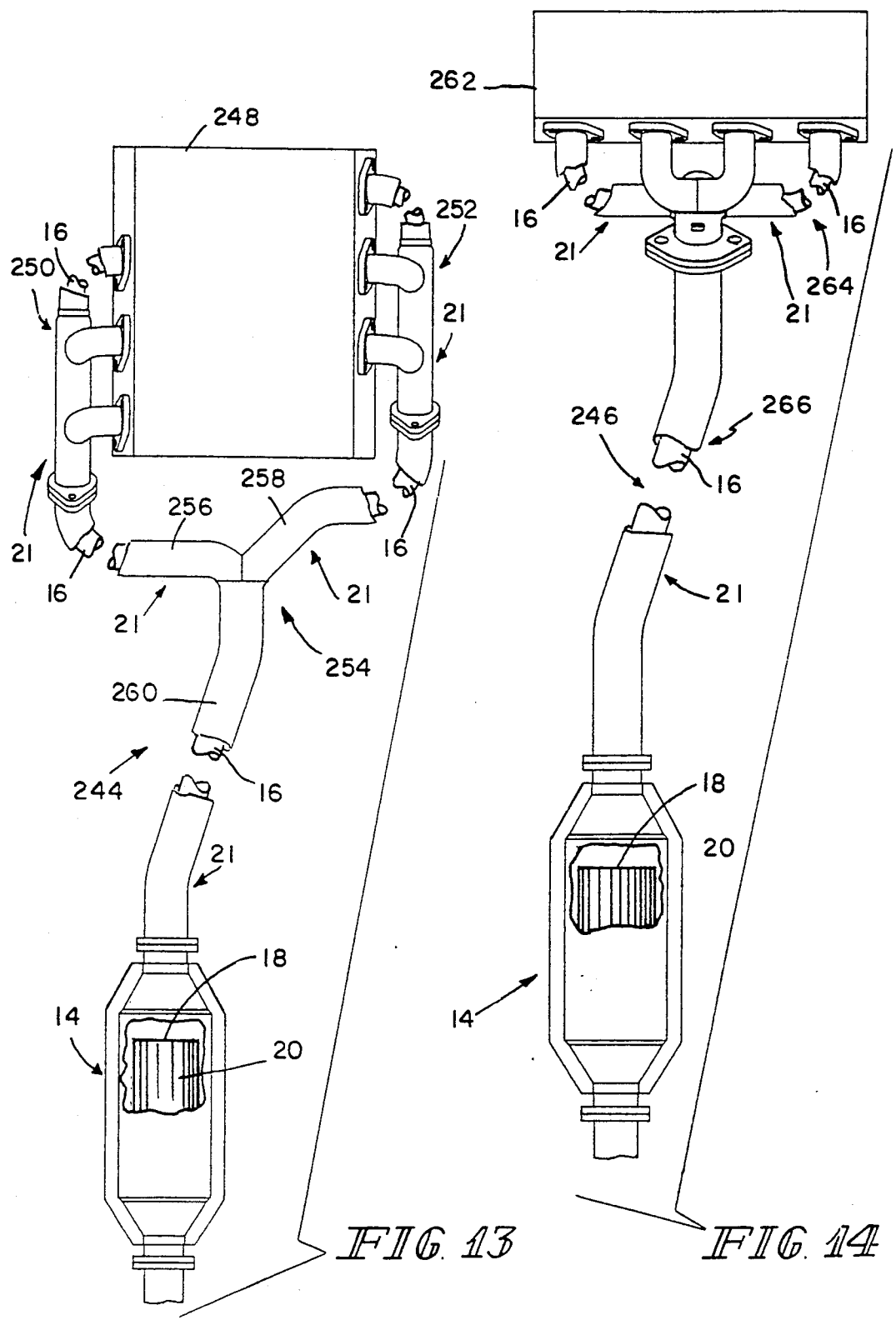

LOW THERMAL CAPACITANCE EXHAUST SYSTEM FOR AN INTERNAL COMBUSTION ENGINE

BACKGROUND AND SUMMARY OF THE INVENTION

This invention relates to engine exhaust systems, and particularly to a system for rapidly heating a catalytic converter or other exhaust processor to its minimum operating temperature at the beginning of a cold start cycle of an engine. More particularly, this invention relates to a system for reducing emissions from an exhaust system by conducting combustion product from the engine to heat a catalytic converter quickly to reduce the amount of time it takes for the catalytic converter to be heated from a cold start temperature to its minimum operating temperature during the initial moments of an engine cold start cycle.

Exhaust processors such as catalytic converters, particulate traps, and other contaminant filters are mounted on board a vehicle to clean and filter combustion product produced by the engine before the combustion product is discharged into the atmosphere through a tail pipe. A catalytic converter typically includes a catalyzed ceramic or metal substrate that is configured to purify the hot combustion product produced by the engine to remove certain contaminants from the engine exhaust. The catalytic converter treats the combustion product to produce an exhaust stream meeting stringent state and federal environmental regulations and emission standards.

Typically, hot combustion product is conducted through a pipe mounted under the body of a vehicle between an engine and a remote exhaust processor. The temperature of the combustion product decreases somewhat during this journey. At the beginning of a cold start of an engine, the exhaust processor is "cold" and typically has a temperature that is about equal to the temperature of the surroundings. Over time, the hot combustion product produced by a cold-started engine heats the substrate and housing in the exhaust processor to an operating temperature.

A catalyzed substrate purifies contaminants from engine combustion product most efficiently at high temperatures. However, a catalyzed substrate does not actively and efficiently treat combustion product until it is heated to a minimum operating temperature during the initial moments of an engine cold start cycle. A catalytic converter is said to "light off" when it is heated to its minimum operating temperature and begins to purify combustion product in an effective manner.

A substantial reduction in tail pipe emissions measured using the Federal Test Procedure can be realized by minimizing the elapsed time between engine ignition and catalytic converter light off during an engine cold start cycle. The majority of total emissions occurs during the cold start portion of the Federal Test Procedure before the catalytic converter has been heated to reach its minimum operating temperature. Accordingly, vehicle emissions can be reduced by achieving faster light off of the catalytic converter at the beginning of an engine cold start cycle.

With respect to the above-noted problem, U.S. Pat. No. 4,731,993 to Ito et al discloses a rear exhaust manifold having thick walls and a front exhaust manifold made of a thin stainless steel plate so that the front exhaust manifold has walls thinner than the walls of the rear exhaust manifold. It is also known from U.S. Pat. No. 5,018,66 to Cyb to apply a thin layer of heat-resistant compound to the interior of an exhaust manifold and from U.S. Pat. No. 5,004,018 to Bainbridge to provide an insulated exhaust pipe including inner and outer spaced tubes separated by refractory fiber insulation. Systems using electrically heated catalytic converters and catalytic converters containing increased amounts of precious metals are also known.

There is a need to improve vehicle emission controls to meet increasingly stringent emission standards. An exhaust system configured to provide quicker light off of the catalytic converter using heat energy contained in the hot combustion product produced by an engine would be an improvement over conventional exhaust systems.

Conventional exhaust systems typically use relatively thick-walled pipes made of heavy gauge metal to conduct combustion product from the exhaust manifold to the catalytic converter. The wall of a conventional cast iron manifold or pipe is typically 6.0 mm (0.236 inch) and the wall of a conventional stainless steel exhaust system pipe is 1.4–1.8 mm (0.055–0.071 inch). Because of the heavy gauge metal structure, these conventional pipes have a high "thermal capacitance." That is, the product of the mass and specific heat of these conventional combustion product-carrying pipes is quite large and they act as large heat sinks for hot combustion product in the exhaust system during the initial moments of an engine cold start cycle. For example, the thermal capacitance per unit length per unit diameter of a conventional pipe made of exhaust grade stainless steel and having a wall thickness of 1.78 mm (0.70 inch) is about $$20,000 \frac{J}{m^2 \cdot K}.$$

As a result of the high thermal capacitance of the conventional exhaust system pipes, a large portion of the heat energy from the combustion product is consumed in heating the heavy gauge pipes. By allowing heat energy from the combustion product to be diverted to the pipes, less heat energy is available to heat the catalyzed substrate to its minimum operating temperature at the beginning of a cold start cycle of an engine.

It would be desirable to reduce the amount of heat energy used to heat pipes in an exhaust system during the initial moments of an engine cold start cycle. This conservation of heat energy would help to raise the temperature of the substrate to reach its minimum operating temperature in less time. Tail pipe emissions would be reduced if the substrate in an improved exhaust system reached its minimum operating temperature at an earlier point during an engine cold start cycle.

According to the present invention, an apparatus is provided for delivering combustion product from an engine to an exhaust processor which has an inlet and a predetermined minimum operating temperature. The apparatus includes a thin-walled pipe conducting hot combustion product from the engine to the inlet of the exhaust processor. The thin-walled pipe has a thermal capacitance per unit length per unit diameter of less than $$12{,}200 \frac{J}{m^2 \cdot K}$$

to minimize the elapsed time during a cold start cycle of the engine until the inlet of the exhaust processor is heated by the combustion product to reach its predetermined minimum operating temperature. Advantageously, this thin-walled pipe has a low thermal capacitance and is responsible for reducing the time it takes to achieve light off by minimizing diversion of heat energy from the hot combustion product to the pipe as the combustion product is conducted from the engine to the exhaust processor during an engine cold start cycle so that total emissions are reduced.

Preferably, the thin-walled pipe includes a tubular wall having a wall thickness of less than 1.10 mm (0.043 inch) and is made of exhaust grade stainless steel which has a density of $$7695 \frac{kg}{m^3}$$

and a specific heat of $$460 \frac{J}{kg \cdot K}.$$

Thus, the thin-walled pipe has a low thermal capacitance per unit length per unit diameter of less than $$12{,}200 \frac{J}{m^2 \cdot K}$$

so it does not act as a significant heat sink to divert heat energy in the combustion product away from the inlet of the exhaust processor at the beginning of an engine cold start cycle. The thermal capacitance of a material is the product of the volume, density, and specific heat of the material. In a presently preferred embodiment, the wall thickness of the tubular side wall is 0.46 mm (0.018 inch) and has a low thermal capacitance per unit length per unit diameter of $$5{,}100 \frac{J}{m^2 \cdot K}.$$

In preferred embodiments, the apparatus further includes an outer shell extending between the engine and the inlet of the exhaust processor. This outer shell is a large diameter pipe that surrounds the thin-walled pipe and is made of a relatively heavy gauge metal. The apparatus further includes means for supporting the thin-walled pipe inside the passageway formed in the outer shell in spaced-apart relation to the outer shell to establish an annular air gap therebetween. Advantageously, the outer shell and the supporting means are configured to protect and support the thin-walled pipe along its entire length between the engine and the exhaust processor without absorbing a lot of heat from engine combustion product at engine start-up.

In other preferred embodiments, the thin-walled pipe is positioned to extend into and through the exhaust manifold that is attached to the engine. The thin-walled pipe is supported in the interior region formed in the exhaust manifold to lie in spaced-apart relation to an interior wall of the exhaust manifold. Preferably, an annular air gap is formed around the thin-walled pipe to insulate the thin-walled pipe and reduce conductive heat transfer from the thin-walled pipe to the surrounding exhaust manifold.

The use of a thin-walled pipe having a low thermal capacitance to conduct hot combustion product from an engine to the inlet of an exhaust processor causes the heat energy in the combustion product to reach the exhaust processor in a shorter period of time during the start-up of a cold engine. This low thermal capacitance thin-walled pipe provides an improvement over pipes in conventional exhaust systems in that it causes the catalytic converter in the exhaust processor to be heated to its minimum operating temperature and light off more rapidly at the beginning of a cold start cycle of the engine. Consequently, the catalytic converter is active to lower total vehicle emissions without resorting to complex exhaust control mechanisms, costly exhaust system materials, or electrically preheated catalytic converters. Essentially, the low thermal capacitance thin-walled pipe conserves the heat energy already available in the hot combustion product discharged by the engine and uses that heat energy to effectively light off the catalytic converter very early in the cold start cycle of an engine and reduce total emissions and resulting pollution.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a plan view of an apparatus for delivering combustion product from a transverse, V-type engine to an exhaust processor in accordance with the present invention showing a thin-walled pipe extending through an outer shell providing an exhaust manifold, crossover pipe, and a converter inlet pipe;

FIG. 2 is an enlarged sectional view of a portion of the crossover pipe taken along lines 2—2 of FIG. 1 showing an expansion joint of the thin-walled pipe that is positioned inside a flexible bellows forming a portion of the outer shell;

FIG. 3 is an enlarged sectional view of a portion of the apparatus taken along lines 3—3 of FIG. 1 showing the connection of the outer shell to the thin-walled pipe at the inlet of the exhaust processor;

FIG. 4 is an enlarged sectional view of another portion of the apparatus taken along lines 4—4 of FIG. 1 showing the thin-walled pipe inside the outer shell at the union of the exhaust manifold and the converter inlet pipe;

FIG. 5 is a sectional view of the portion of the apparatus of FIG. 4 taken along lines 5—5 of FIG. 4;

FIG. 7 is a sectional view similar to FIG. 2 showing an expansion joint for the thin-walled pipe inside an outer pipe;

FIG. 8 is a sectional view showing an inlet flange connection;

FIG. 9 is a sectional view similar to FIG. 8 showing yet another embodiment of an inlet flange connection;

FIG. 10 is a sectional view similar to FIG. 3 showing another embodiment of an outlet flange connection;

FIG. 11 is a plan view of another embodiment of an apparatus in accordance with the present invention wherein a transverse, V-type engine, a pair of upstream exhaust processors, and a single downstream exhaust processor are connected using a low thermal capacitance, thin-walled pipe;

FIG. 12 is an enlarged sectional view of a portion of the apparatus of FIG. 11;

FIG. 13 is a plan view of yet another embodiment of an apparatus in accordance with the present invention wherein a V-type engine and an exhaust processor are connected using a low thermal capacitance, thin-walled pipe;

FIG. 14 is a plan view of still another embodiment of an apparatus in accordance with the present invention wherein a transverse inline-type engine and an exhaust processor are connected using a low thermal capacitance, thin-walled pipe;

DETAILED DESCRIPTION OF THE DRAWINGS

Figure 6:
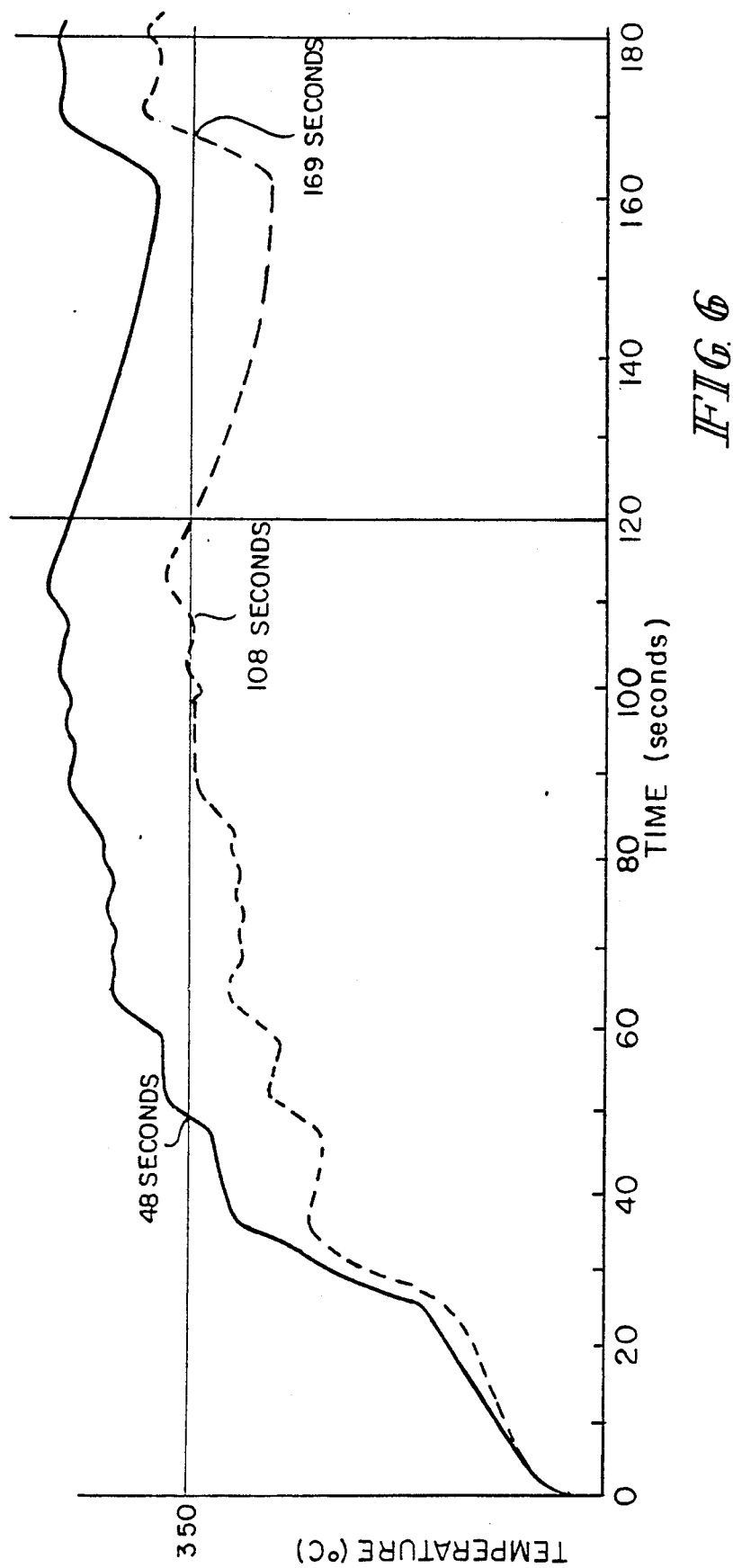
FIG. 6 is a plot of the temperature at the inlet of the exhaust processor (°C.) versus time (seconds) during the cold start portion of the Federal Test Procedure (FTP) driving cycle using a conventional combustion product delivery apparatus (dotted line) wherein the light off time is at least 108 seconds and a second cold start engine cycle using an apparatus for delivering combustion product from an engine to an exhaust processor in accordance with the present invention (solid line) wherein the light off time is 48 seconds.

An improved exhaust system 10 is illustrated in FIG. 1 for conducting hot combustion product from an engine 12 to a catalytic converter 14 through a thin-walled pipe 16. The thin-walled pipe 16 is configured to have a very low thermal capacitance to minimize the amount of heat from the hot combustion product that is absorbed by the thin-walled pipe 16 during the initial moments of a cold start cycle of engine 12. Because of the low thermal capacitance of thin-walled pipe 16, little heat energy from the combustion product passing through thin-walled pipe 16 is diverted away from catalytic converter 14. Improved exhaust systems 210, 244, and 246 for use with a variety of other engine designs are shown in FIGS. 11, 13, and 14.

A catalytic converter is said to light off when its catalyzed substrate is heated to its minimum operating temperature and begins to purify combustion product in an effective manner. Advantageously, the thin-walled pipe 16 conducts hot combustion product from engine 12 to catalytic converter 14 efficiently so that the inlet end 18 of the substrate 20 provided in catalytic converter 14 is heated rapidly to a predetermined minimum operating temperature. As a result, the catalytic converter 14 lights off and operates effectively at a very early point in the cold start cycle of engine 12 to clean and purify the combustion product passed therethrough. For example, the predetermined minimum operating temperature (i.e., light off temperature) of a ceramic substrate impregnated with a catalyst is about 250°–350° C. (482°–662° F.).

Preferably, the thin-walled pipe 16 has a thermal capacitance per unit length per unit internal diameter of less than $$12,200 \frac{J}{m^2 \cdot K}.$$

Because of its low thermal capacitance, thin-walled pipe 16 does not act as a significant heat sink to divert heat energy in the combustion product passing through thin-walled pipe 16 away from the inlet end 18 of substrate 20 in catalytic converter 14 at the beginning of a cold start cycle of engine 12. The thermal capacitance of a material is the product of the volume, density, and specific heat of the material.

Illustratively, thin-walled pipe 16 is made of type 439 (AISI) stainless steel which has a density of $$7695 \frac{kg}{m^3}$$

and a specific heat of $$460 \frac{J}{kg \cdot K}.$$

Further, the illustrative thin-walled pipe 16 has a wall thickness of 0.46 mm (0.018 inch). Such a thin-walled pipe 16 has a thermal capacitance per unit length per unit diameter of $$5,100 \frac{J}{m^2 \cdot K}.$$

A thin-walled pipe (not shown) that is made of type 439 (AISI) stainless steel and has a wall thickness of 1.10 mm (0.043 inch) would have a thermal capacitance per unit length per unit diameter of $$12,200 \frac{J}{m^2 \cdot K}.$$

Other suitable thin-walled pipe materials include any material suitable for the high temperature, corrosive environment of an automotive exhaust system.

A hollow outer shell 21 extends between the engine 12 and the inlet end 30 of catalytic converter 14 and around the thin-walled pipe 16 as shown in FIG. 1. The outer shell 21 is made of a sturdy material such as type 409 (AISI) stainless steel and has a wall thickness of 1.4 mm (0.055 inch). Preferably, the wall thickness of the outer shell is greater than 1.10 mm (0.043 inch). The outer shell 21 could alternatively be made of other materials suitable for the high temperature, corrosive environment of an automotive exhaust system.

The thin-walled pipe 16 is supported inside the hollow outer shell 21 so that the outer shell 21 provides a protective shield and support structure extending along and around the thin-walled pipe 16 as shown in FIG. 1. A plurality of stand-off members (similar to those shown in FIGS. 4, 5, and 12) may be located in the space between thin-walled pipe 16 and outer shell 21. These stand-off members are pressed into hollow outer shell 21 at various points throughout the exhaust system 10 to support the thin-walled pipe 16 in spaced relation to the hollow outer shell 21 so that an annular air gap is provided inside hollow outer shell 21 along and around the thin-walled pipe 16. Conductive heat transfer between the thin-walled pipe 16 and the surrounding hollow outer shell 21 is minimized by keeping the size and number of stand-off members to a minimum.

The outer shell 21 serves primarily as a structural support and shield for thin-walled pipe 16. Although the annular air gap inside the hollow outer shell 21 along and around the thin-walled pipe 16 does provide a layer of insulation between the thin-walled pipe 16 and the hollow outer shell 21, this air gap is effective to minimize heat loss from the hot combustion product passing through thin-walled pipe 16 only after engine 12 has warmed up and steady-state heat-transfer conditions have developed, not during a cold start when transient heat transfer conditions prevail. Testing has established that no matter how the outside of thin-walled pipe 16 is insulated (air gap or otherwise), the key to reducing the light off time of the substrate 20 in catalytic converter 14 is to minimize the thermal capacitance of the thin-walled pipe 16 in accordance with the present invention.

Engine 12 is illustratively a transversely mounted V-type six-cylinder engine as shown in FIG. 1. A first manifold 22, second manifold 24, and crossover pipe 26 interconnecting the first and second manifolds 22, 24 are used to connect the engine 12 to a converter inlet pipe 28 that is coupled to the inlet end 30 of the catalytic converter 14. The thin-walled pipe 16 includes sections 34, 38, 42, and 46 and the hollow outer shell 21 includes portions 32, 36, 40, and 44 as described in the following paragraphs.

The first manifold 22 includes an outer shell portion 32 containing a first section 34 of thin-walled pipe 16 therein and the second manifold 24 includes an outer shell portion 36 containing a second section 38 of thin-walled pipe 16 therein. The crossover pipe 26 includes an outer shell portion 40 containing a third section 42 of thin-walled pipe 16 therein and the converter inlet pipe 28 includes an outer shell portion 44 containing a fourth section 46 of thin-walled pipe 16 therein.

The first manifold 22 is shown in FIG. 1 and is configured to collect the combustion product discharged from a first set of three cylinders (not shown) of engine 12 and conduct that combustion product to crossover pipe 26 for delivery to converter inlet pipe 28. The first section 34 of thin-walled pipe 16 is coupled to each of cylinders in the first set and is surrounded by the outer shell portion 32 as shown in FIG. 1. Illustratively, the outer shell portion 32 includes first, second, and third side branches 48, 50, and 52 coupled to engine 12 and a main shell 54 coupled to the outer shell portion 40 of the crossover pipe 26 and to the side branches 48, 50, and 52. The outer shell 32 is configured to include dimples, standoffs, or the like or additional supports (not shown) mounted between the outer shell portion 32 and the thin-walled pipe 16 to support the first section 34 of thin-walled pipe 16 in spaced-apart relation to most of the interior wall of the outer shell portion 32 to define an elongated annular air gap along the length of first section 34 and between the exterior surface of first section 34 and the interior wall of the outer shell portion 32.

The second manifold 24 is shown in FIG. 1 and is configured to collect the combustion product discharged from a second set of three cylinders (not shown) of engine 12 and conduct that combustion product to converter inlet pipe 28. The second section 38 of thin-walled pipe 16 is coupled to each of the cylinders in the second set and is surrounded by the outer shell portion 36 as shown in FIGS. 1, 4, and 5. Illustratively, the outer shell portion 36 includes first, second, and third side branches 56, 58, and 60, a crossover inlet branch 62, and an outlet branch 64. The second section 38 of thin-walled pipe 16 includes a first branch pipe 66 in first side branch 56, a second branch pipe 68 in second side branch 58, a third branch pipe 70 in third side branch 60, a crossover branch pipe 72 in crossover inlet branch 62, and an outlet conduit 74 coupled to receive combustion product from each of the branches 66, 68, 70, and 72 and arranged to lie inside outlet branch 64.

As shown best in FIGS. 4 and 5, each of outer shell branches 56, 58, 60, and 62 are formed to include inwardly projecting dimples 76 or the like which serve as standoffs to support the branch pipes 66, 68, 70, and 72 in spaced-apart relation to define an annular air gap between each outer shell branch and the branch pipe positioned therein. The dimples 76 have a small thin-walled pipe 16 contact area and supply little resistance to sliding. As the branch pipes 66, 68, 70, and 72 heat up during exposure to hot combustion gases, the pipes will undergo thermal expansion relative to one another and relative to the surrounding outer shell portions. Advantageously, the rounded protrusions provided by dimples support the branch pipes in an axially centered position inside the outer shell portions so that the branch pipes can slide or move relative to one another and to the outer shell portions and relative to the surrounding outer shell portions during thermal expansion of the branch pipes. Also, the dimples are formed to have a small surface area in contact with the thin-walled pipe 16 to minimize conductive heat transfer from the thin-walled pipe 16 to the hollow outer shell 21 during passage of hot combustion product through the thin-walled pipe 16 to the catalytic converter.

It will be understood that it is within the scope of the present invention to vary the number and location of dimples 76 or other standoff members around the thin-walled pipe 16 and along thin-walled pipe 16 in first manifold 22, second manifold 24, crossover pipe 26, and converter inlet pipe 28. The number and location of dimples 76 is selected to hold the thin-walled pipe 16 and its various sections and branches in generally axially centered positions inside the hollow outer shell 21 and to permit relative movement of the thin-walled pipe sections relative to each other and to the surrounding outer shell 21 during exposure of the thin-walled pipe 16 to hot combustion product.

Referring to FIGS. 1 and 4, it will be apparent that the crossover inlet branch 62 of outer shell 21 includes a flange 78 for connecting to the outer shell 40 of the crossover pipe 26 and the outlet conduit 64 includes a flange 80 for connecting to the outer shell 44 of the converter inlet pipe 28. Further, each of flange 82 on first side branch 56, flange 84 on second side branch 58, and flange 86 on third side branch 60 is configured to mount on engine 12 to facilitate coupling of the thin-walled pipe 16 and the hollow outer shell 21 in the second manifold 24 to the engine 12. Likewise, flanges are provided as shown in FIG. 1 for facilitating coupling of pipe 16 and shell 21 in the first manifold 22 to the engine 12.

A sensor-receiving fixture 88 is fixed to extend through coaxial apertures formed in the outlet conduit 74 of thin-walled pipe 16 and the outlet branch 64 of the hollow outer shell 21 to receive a sensor (not shown) or other device therein to facilitate collection of data for engine control from the combustion product passing by the sensor. It will be understood that a sensor-receiving fixture 88 could be located at any point in exhaust system 10 to penetrate the thin-walled pipe 16 and the hollow outer shell 21 and support a sensor or the like therein.

Referring to FIG. 5, it will be seen that outlet conduit 74 includes a flared end 90 located at its distal end and configured to couple to the distal end 94 of third side branch 60 and the distal end 92 of second side branch 58. The distal ends 92, 94 mate as shown in FIG. 5 along line 95 to form a Y-type joint wherein combustion product from second and third side branch pipes 68, 70 is discharged into the outlet conduit 74 for delivery to the fourth section 46 of the thin-walled pipe 16 in converter inlet pipe 28.

Also, the distal end of outlet branch 64 includes a flared end 91 that is coupled to the second and third side branches 58, 60 of outer shell portion 36 as shown best in FIG. 5. Weld connections 96a, 96b, and 96c are used to fix the crossover inlet branch 62 and the first side branch 56 to the outlet branch 64 and to fix the flared flange 91 of the outlet branch 64 to each of the second and third side branches 58, 60. The flared flange 90 on outlet conduit 74 is illustratively trapped between the second and third side branches 58, 60 and the inner wall of the flared flange 91 on outer branch 64 as shown in FIGS. 4 and 5.

The crossover pipe 26 is shown in FIGS. 1 and 2. It includes a first outer pipe section 110, a second outer pipe section 112, and a bellows 114 interconnecting the first and second sections 110, 112. These elements 110, 112, and 114 cooperate to provide the hollow outer shell 21 in crossover pipe 26. The third section 42 of thin-walled pipe 16 in crossover pipe 26 includes a first inner pipe section 116 having a necked-down end 118 that fits into the cylindrical end 120 of a second pipe section 122. As shown in FIG. 2, the upstream section 116 of thin-walled pipe 116 is sized down or otherwise made to fit inside the downstream section 122. This overlapping, nested arrangement allows the sections 116, 122 to slide freely relative to one another and relative to the surrounding outer shell 40. The outer shell 40 may or may not require a bellows such as bellows 114 depending upon the application. The annular air gap 124 around thin-walled pipe 16 and the hollow outer shell 21 in crossover pipe 26 is shown clearly in FIG. 2.

The converter inlet pipe 28 includes a first mounting flange 126 coupled to the flange 80 carried on outlet branch 64 of the second manifold 24 as shown in FIG. 4 and a second mounting flange 128 coupled to a mounting flange provided at the inlet 30 of the catalytic converter 14 as shown in FIG. 1. The upstream end of the fourth section 46 of thin-walled pipe 16 is coupled to the outlet conduit 74 to receive combustion product discharged from the first and second manifolds 22, 24. The downstream end of the fourth section 46 of thin-walled pipe 16 is coupled to the inlet end 30 of the catalytic converter 14 to deliver all combustion product generated by engine 12 to the substrate 20 in catalytic converter 14.

The downstream end 130 of the converter inlet pipe 28 is shown in detail in FIG. 3. The downstream end 132 of the fourth section 46 of the thin-walled pipe 16 is slidably received in a necked-down end 134 of the downstream end 136 of the outer shell 44. This connection is designed to allow for sliding of the thin-walled pipe 16 relative to the outer shell 21 in the downstream end 130. As shown in FIG. 3, the end 138 of thin-walled pipe 16 is set back a distance 140 from the weld 142 so that pipe 16 is not fixed in place by weld 142. This arrangement may require extra provisions for venting any pressure that happens to build up in annular air gap 144 as the temperature increases. One or more small holes or louvers in the thin-walled pipe 16 will function to provide sufficient venting.

The exhaust system 10 has thin-walled combustion product carrying pipe 16 having a wall thickness of less than 1.10 mm (0.043 inch) to reduce the thermal capacitance of the pipe means that is in contact with the combustion product carried in pipe 16 as compared to a conventional exhaust system (not shown). After "cold starting" the engine, the lower thermal capacitance results in a higher rate of temperature increase of the exhaust gas at the inlet end 18 of the catalyzed substrate 20 in the catalytic converter 14. The converter 14, then, reaches operating temperatures or "lights off" more quickly than a converter included in a conventional exhaust system. Quicker light off of the converter 14 results in a substantial reduction in tail pipe emissions measured using the Federal Test Procedure (FTP). Light off is very important because the majority of the total emissions typically occurs during the cold start portion of the test before the catalytic converter has reached its minimum operating temperature.

The rapid temperature rise of the combustion product entering the substrate 20 in the catalytic converter 14 in exhaust system 10 as compared to the relatively slower temperature rise of combustion product entering the converter substrate in a conventional exhaust system (not shown) is illustrated in FIG. 6. An exhaust system 10 in accordance with the present invention wherein the thin-walled pipe 16 was made of type 439 (AISI) stainless steel and the thin-walled pipe sections 22, 24, and 26 had a wall thickness of 0.46 mm (0.018 inch) and the thin-walled pipe section 28 had a wall thickness of 0.33 mm (0.013 inch) was tested and a plot of the temperature at the inlet 18 of substrate 20 as a function of time during the initial cold start portion of the FTP is shown in solid line in FIG. 6. A conventional exhaust system (not shown) wherein the single wall manifold was made of cast iron and had a wall thickness of 6.0 mm (0.236 inch) and the single wall pipe connecting the manifold to the converter was made of type 409 (AISI) stainless steel and had a wall thickness of 1.40 mm (0.055 inch) was tested and a plot of temperature at the inlet of the converter substrate as a function of time during the initial cold start portion of the FTP is shown in dotted lines in FIG. 6.

The catalytic converter light off time is defined as the time required for the inlet end 18 of substrate 20 to reach a temperature of 350° C. (662° F.). This temperature is on the low end of the operating range of a typical catalytic converter. The test results comparing the effectiveness of a conventional exhaust system to the improved exhaust system 10 show that using the low thermal capacitance exhaust system 10 of the present invention reduces the light off time by more than half from 108 seconds to 48 seconds. As a result, the catalytic converter 14 in the improved exhaust system 10 begins to operate sooner in a cold start engine cycle, thereby cutting tail pipe emissions substantially.

An additional benefit of the low thermal capacitance exhaust system 10 is that it operates to maintain the substrate inlet temperature above the 350° C. (662° F.) minimum operating temperature throughout the cold transient portion of the FTP. The conventional system, on the other hand, allowed the substrate inlet temperature (dotted line plot) to drop below the 350° C. (662° F.) minimum operating temperature for sixty-one seconds during the deceleration and idle period. As a result, the catalytic converter 14 in the improved exhaust system 10 functions for a longer period of time during a cold start engine cycle to cut tail pipe emissions even further.

Although a continuous thin-walled pipe 16 is shown in the embodiment of FIGS. 1–5 to extend from engine 12 to catalytic converter 14, it is within the scope of the present invention to use a low thermal capacitance thin-walled pipe only in the collector of a manifold, the crossover pipe, and/or the converter inlet pipe. These arrangements would still thermally isolate the exhaust flow from the outer shell for a certain part of the journey of the hot combustion product from the engine to the catalytic converter.

In addition to serving as a stand-alone system, the exhaust system 10 could be used in conjunction with an electrically heated converter (not shown). In such an application, less heat energy would need to be added to the exhaust gases to light off the converter. The need for less heat energy from the electrical converter heater would reduce the current draw of the system and perhaps eliminate the need for a heavy-duty alternator and/or an extra battery.

Several alternative embodiments of pipe joints suitable for use in the improved exhaust system are shown in FIGS. 7–10. A thermal expansion joint 146 similar to the joint shown in FIG. 2 is illustrated in FIG. 7. In this embodiment, a solid outer pipe section 148 is used to interconnect outer pipe sections 150, 152 instead of a bellows such as bellows 114 in FIG. 2. This type of joint could be used in applications that do not require a bellows for expansion of the outer pipe such as a converter inlet pipe or manifold pipe. The solid outer pipe section 148 includes a first flared flange 154 receiving an end of the outer pipe section 150 therein and a second flared flange 156 receiving an end of the outer pipe section 152 therein.

Another joint 158 is illustrated in FIG. 8 wherein a portion of hollow outer shell 21 is necked down at distal end 157 to fit around the bent end of thin-walled pipe 16. The thin-walled pipe 16 and the necked-down end 157 are placed inside an aperture 159 formed in mounting flange 160. A ring 162 made of stainless steel is inserted into the open mouth of thin-walled pipe 16 and functions to secure the inlet end of the inner pipe 16 against hot exhaust flow. It also provides material substantial enough to weld the outer pipe 21, inner pipe 16, and ring 162 to the flange 160.

In the joint 164 shown in FIG. 9, a formed connection is provided wherein the distal end 166 of a thin-walled pipe 16 is located inside a hollow outer pipe 21 and inside a necked-down end 168 of hollow outer pipe 21. A necked-down male end 170 of a bell-shaped formed member 172 is inserted into the open mouth of the distal end 166 of thin-walled pipe 16 as shown in FIG. 9. Weld 174 is formed to interconnect the hollow outer shell 21, thin-walled pipe 16, and the bell-shaped formed member 172. A formed annular flange 176 is placed around the neck 178 of the bell-shaped formed member 172 to rest on the curved shoulder 180 thereof. A mounting aperture 182 is formed in the annular flange 176 as shown in FIG. 9. In use, the base 184 of bell-shaped formed member 172 is coupled to a machined spherical surface or gasket and the annular flange 176 is coupled to a mating flange on the outlet of a manifold so that a transversely mounted engine can rock freely without imparting a load on the exhaust system.

In the joint 186 shown in FIG. 10, a sliding connection is provided wherein a slip ring 188 made of stainless steel mesh or other high temperature material is attached to either the thin-walled pipe 16 or the outer shell 21. Slip ring 188 serves to maintain the annular air gap 190 between hollow outer shell 21 and thin-walled pipe 16 and allow for sliding of the thin-walled pipe 16 relative to the hollow outer shell 21 with little frictional resistance. An outlet fixture 192 includes an annular step end 194 formed to receive the distal end 196 of the hollow outer shell 21 therein and an intermediate step 198 for engaging the radially outwardly facing edge of slip ring 188. Also, outlet fixture 192 includes another stepped end for engaging a mounting flange as shown in FIG. 10.

The various differential expansion joints shown in FIGS. 2–5, 7, and 10 (as well as in FIGS. 12, 15, 16, 18, and 19) allow the thin-walled pipe 16 to operate at a much higher temperature than the outer shell 2 and to expand thermally, independently of the surrounding outer shell 21. This allowance for thermal expansion greatly increases the durability of the thin-walled pipe 16. Without an expansion joint, it is likely that the pipe 16 might buckle if it was constrained at both ends by rigid attachments to the outer shell 21.

These thermal expansion joints are arranged so that the inlet end of the pipe or manifold is fixed to the outer shell and the outlet end is left free to move relative to the outer shell. This arrangement prevents exhaust flow into the annular gap between the thin-walled pipe 16 and the outer shell 21. With the overlap joint as shown in FIGS. 2 and 7, however, both ends of the thin-walled pipe 16 are fixed and flow into the annular air gap is prevented by fitting the upstream portion of the thin-walled pipe inside the downstream portion. Thus, the path from inside the pipe 16 to the annular air gap is opposite in direction to that of the combustion product flow through the thin-walled pipe 16.

An exhaust system 210 in accordance with the present invention is shown in FIGS. 11 and 12. In exhaust system 210, a thin-walled pipe 16 of the type disclosed in the embodiment of FIGS. 1–5 extends from transversely mounted, six-cylinder engine 12 to catalytic converter 14 and a hollow outer shell 21 extends along and around and in spaced-apart relation to the thin-walled pipe 16. The exhaust system 210 includes a first manifold 212, a first close-coupled catalytic converter 214, a second manifold 216, and a second close-coupled catalytic converter 218. The exhaust system 210 also includes a Y-shaped converter inlet pipe 220 including a first leg 222 coupled to the first close-coupled catalytic converter 214, a second leg 224 coupled to the second close-coupled catalytic converter 218, and a base leg 226 coupled to the catalytic converter 14.

The Y-joint 228 included in Y-shaped converter inlet pipe 220 is shown in detail in FIG. 12. The thin-walled pipe 16 includes a first pipe section 230 in first leg 222, a second pipe section 232 in second leg 224, and an outlet pipe section 234 in base leg 226. The base leg 226 includes a flared flange 236 at one end for coupling to the first and second legs 222, 224 and a necked-down portion 238 at the other end for fitting to an aperture 240 formed in mounting flange 242. Also, the outlet pipe section 234 includes a flared flange 237 that is trapped between the exterior wall of the first and second legs 222, 224 and the interior wall of flared flange 237 on base leg 226 as shown in FIG. 12.

Two other alternative exhaust systems 244 and 246 are shown in FIGS. 13 and 14. In FIG. 13, exhaust system 244 includes a thin-walled pipe 16 of the type disclosed in the embodiment of FIGS. 1-5. The thin-walled pipe 16 extends from a six-cylinder engine 248 to a catalytic converter 14 and a hollow outer shell 21 extends along and around and in spaced-apart relation to the thin-walled pipe 16. The exhaust system 244 includes a first manifold 250, a second manifold 252, and a Y-shaped converter inlet pipe 254 having a first leg 256 coupled to the first manifold 250, a second leg 258 coupled to the second manifold 252, and a base leg 260 coupled to the catalytic converter 14. Exhaust system 246 also includes a thin-walled pipe 16 of the type disclosed in the embodiment of FIGS. 1-5. Thin-walled pipe 16 extends from four-cylinder engine 262 to a catalytic converter 14 and a hollow outer shell 21 extends along and around and in spaced-apart relation to the thin-walled pipe 16. The exhaust system 246 includes manifold 264 and a curved converter inlet pipe 266 interconnecting the manifold 264 and the catalytic converter 14. As in the case of the previous embodiments, the low thermal capacitance thin-walled pipe 16 functions to reduce the light off time of catalytic converter 14, thereby minimizing overall tail pipe emissions. Further, outer shell 21 functions to support thin-walled pipe 16 without creating a heat sink that would operate to dissipate heat energy from the hot combustion product traveling through the thin-walled pipe 16 during the initial moments of a cold start engine cycle.

Figure 15:
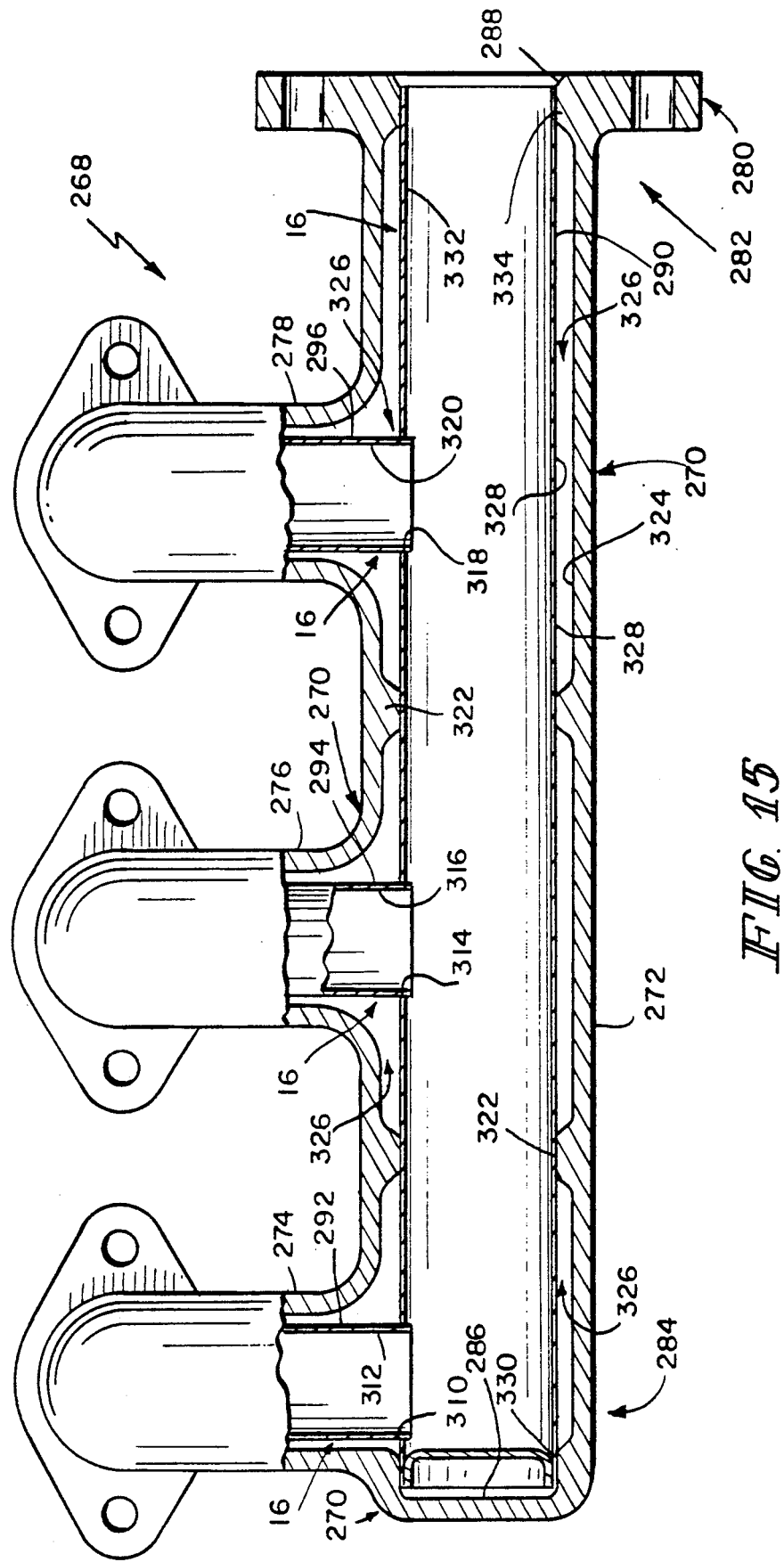
FIG. 15 is a sectional view of a first embodiment of an exhaust manifold in accordance with the present invention wherein the exhaust manifold includes a cast outer shell and a low thermal capacitance thin-walled pipe inside the outer shell.

One preferred embodiment of a manifold in accordance with the present invention is illustrated in FIG. 15. Manifold 268 includes a cast hollow outer shell 270 formed to include a straight main tube 272 and first, second, and third side branches 274, 276, and 278. For example, the outer shell 270 is cast out of cast iron and has a substantially uniform wall thickness of 6.0 mm (0.236 inch). A mounting flange 280 is formed at one end 282 of the main tube 272 to facilitate coupling the manifold 268 to other components in an engine exhaust system. The other end 284 of the main tube 272 is formed to include an internal pipe-receiving socket 286 as shown in FIG. 15.

A thin-walled pipe 16 is positioned inside the hollow space formed inside outer shell 270 to provide means for collecting hot combustion product from each of the three engine cylinders feeding into the side branches 274, 276, and 278 and conducting that hot combustion product to an outlet aperture 288 formed in mounting flange 280, where the hot combustion product can be discharged into a downstream exhaust system component. The thin-walled pipe 16 has a low thermal capacitance of the type already described and includes a main section 290 inside straight main tube 272, a first branch section 292 inside first side branch 274, a second branch section 294 inside second side branch 276, and a third branch section 296 inside third side branch 278. The main section 290 of thin-walled pipe 16 is formed to include a first aperture 310 for receiving the outer end 312 of first side section 292 therein, a second aperture 314 for receiving the outer end 316 of second side section 294 therein, and a third aperture 318 for receiving the outer end 320 of third side section 296 therein.

As shown in FIG. 15, the outer shell 270 is formed to include a plurality of stand-off members 322 along an inner wall 324 thereof to support the main section 290 of thin-walled pipe 16 inside the hollow space formed in the straight main tube 272. The main section 290 is supported to define an annular space 326 along and around main section 290 and between the inner wall 324 of main tube 270 and an outer wall 328 of main section 290. The main section 290 of thin-walled pipe 16 is free to move axially somewhat with the main tube 272 because one end 330 of main section 290 is loosely inserted into and slidably received in the pipe-receiving socket 286 formed in end 284 of outer shell 270 and/or the other end 332 is slidably supported by annular collar 334 formed near the mouth 288 of the passageway formed in main tube 272. The support structure allows the various sections 290, 292, 294, and 296 of thin-walled pipe 16 to move relative to one another and the surrounding outer shell during passage of hot combustion product through the thin-walled pipe 16 in manifold 268. Also, the outer shell 270 shields and supports the low thermal capacitance thin-walled pipe 16 without serving as a significant heat sink to dissipate heat energy from the hot combustion product during the initial moments of an engine cold start cycle.

Figure 16:
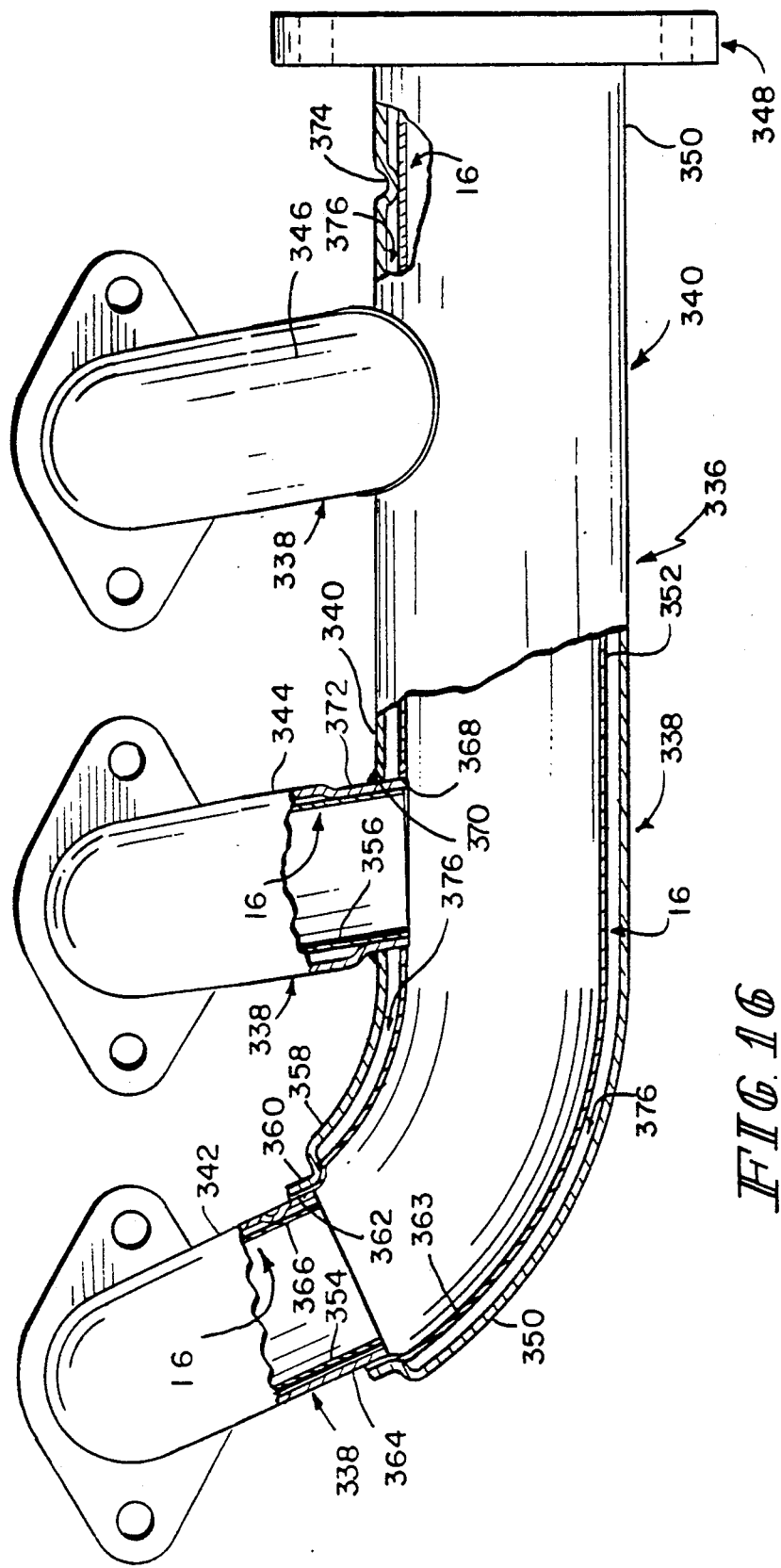
FIG. 16 is a sectional view of a second embodiment of an exhaust manifold in accordance with the present invention wherein the exhaust manifold includes a concentric outer pipe and a low thermal capacitance thin-walled pipe inside the outer pipe.

Another preferred embodiment of a manifold in accordance with the present invention is illustrated in FIG. 16. Manifold 336 includes a tubular hollow outer shell 338 formed to include a bent main tube 340 and first, second, and third side branches 342, 344, and 346. For example, the outer shell 338 is formed out of type 409 (AISI) stainless steel and has a substantially uniform wall thickness of 1.4 mm (0.055 inch). A mounting flange 348 is coupled to the straight end 350 of main tube 340 to facilitate connecting manifold 336 to a downstream exhaust system.

A thin-walled pipe 16 is positioned inside the hollow space formed inside outer shell 338 to provide means for collecting hot combustion product from each of the three engine cylinders feeding into the side branches 342, 344, and 346 and conducting hot combustion product to an outlet aperture formed in end 350 of main tube 340, where the hot combustion product can be discharged into a downstream exhaust system component. The thin-walled pipe 16 has a low thermal capacitance of the type already described and includes a main section 352 inside the bent main tube 340, a first branch section 354 inside first side branch 342, a second branch section 356 inside second side branch 344, and a third branch section (not shown) inside third side branch 346.

As shown in FIG. 16, the main tube 340 includes a slightly curved or bent end 358 that is formed to include a sized annular end 360 surrounding an inlet aperture 362. The main section 352 of thin-walled pipe 16 includes a slightly curved or bent end 363 that is necked down somewhat to fit into the inlet aperture 362. The first side branch 342 includes a tubular first end 364 that is inserted into the inlet aperture 362 of the thin-walled pipe 16. The first side branch 342 is formed to include at least one radially inwardly projecting dimple 366 for slidably supporting the first branch section 354 therein so that hot combustion product passing through first branch section 354 is discharged into the main section 352 of thin-walled pipe 16.

To accommodate the second side branch 344, the main section 352 of thin-walled pipe 16 is formed to include a first side aperture 368 and the main tube 340 of the tubular outer shell 338 is formed to include a second side aperture 370 that is aligned in coaxial relation to the first side aperture 368. As shown in FIG. 16, the second side branch 344 includes a necked-down tubular end 372 that passes through the side apertures 368, 370 and is welded to the main tube 340. The second branch section 356 of thin-walled pipe 16 is supported by the necked-down tubular end 372 to discharge hot combustion product into the bent main tube 340 and permit sliding movement between the second branch section 356 of thin-walled pipe 16 and the second side branch 344 and the main section 352 of thin-walled pipe 16. The third side branch 346 is internally configured in a manner similar to second side branch 344.

The main tube 340 is also formed to include a plurality of dimples 374 along its length to support the thin-walled pipe 16 for sliding movement therein. Dimples 374 or other suitable stand-offs also function to support the thin-walled pipe 16 in spaced-apart relation to the outer shell 338 to define an annular air gap 376 therebetween which extends along and around the main section 352 of thin-walled pipe 16.

Figure 17:
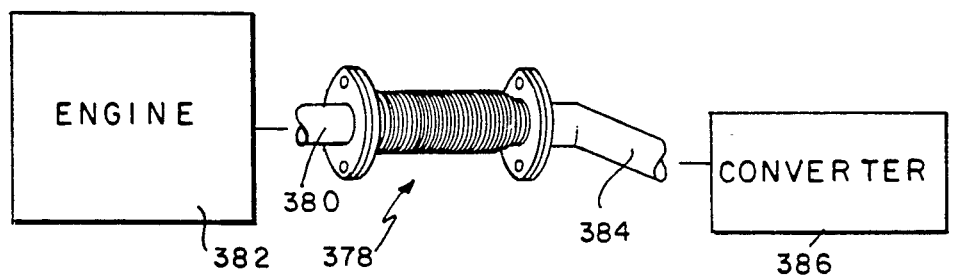
FIG. 17 is a diagrammatic view showing an improved flexible joint in accordance with the present invention.

As shown in FIG. 17, exhaust systems of vehicles with transversely mounted engines sometimes include a "flex joint" 378 interconnecting a pipe 380 coupled to engine 382 and a pipe 384 coupled to catalytic converter 386. The purpose of the flex joint 378 is to isolate the rocking motion of the engine 382 from the underbody portion of the exhaust system. This type of joint will likely be more common on future vehicles due to laws requiring On Board Diagnostic (OBD) systems. The OBD system will include oxygen sensors upstream and downstream of the catalytic converter 386 to monitor its efficiency and indicate a problem if one exists. "Ball joints" that are more common on current vehicles leak, which could lead to erroneous oxygen concentration readings. This problem could interfere with the OBD system and/or the fuel-air ratio control of the engine depending on the location of the upstream oxygen sensor. Flex joints, however, eliminate this leakage.

Figure 18:
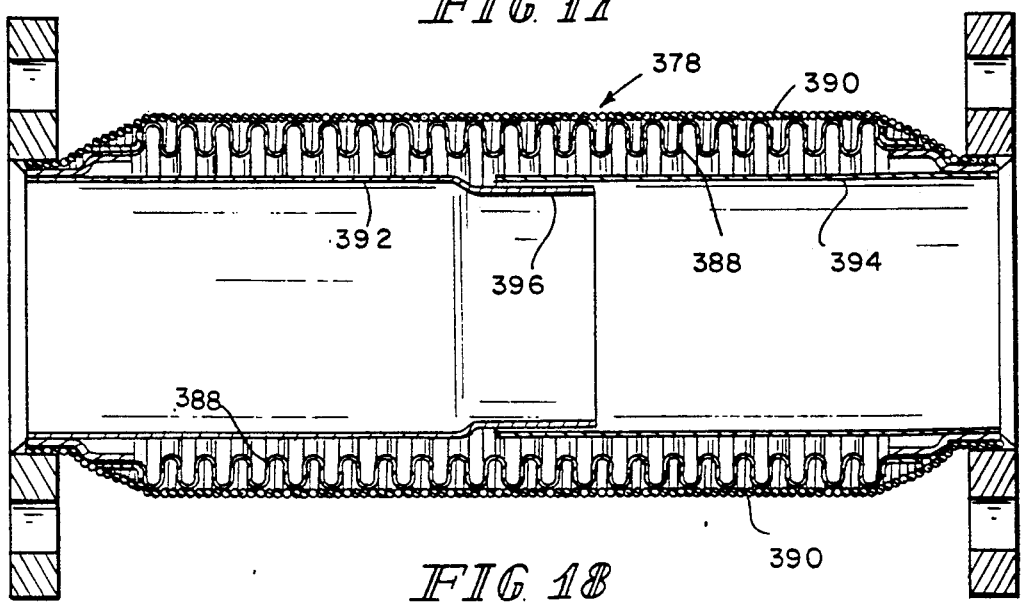
FIG. 18 is an enlarged sectional view of the joint of FIG. 17 showing an expansion joint of an internal thin-walled pipe.

Flex joint 378 includes a bellows 388 covered by braided wire 390. As shown in FIG. 18, the flex joint 378 is lined internally by a thin-walled pipe 16. As in the previous embodiments, the thin-walled pipe 16 has a low thermal capacitance that leads to faster light off of the catalytic converter 386.

In the embodiment shown in FIG. 18, the thin-walled pipe 16 is made from two thin-walled pipes 392, 394, each held at one end by attachment to a flange. The upstream portion 392 includes a necked-down portion 396 that is sized to fit inside the downstream portion 394 to create an overlapping joint. The design of the overlap is such that the liner sections 392, 394 can thermally expand, the joint will allow a certain degree of bending, and the exhaust flow must reverse direction to enter the gap between the bellows 388 and the thin-walled pipe sections 392, 394.

Figure 19:
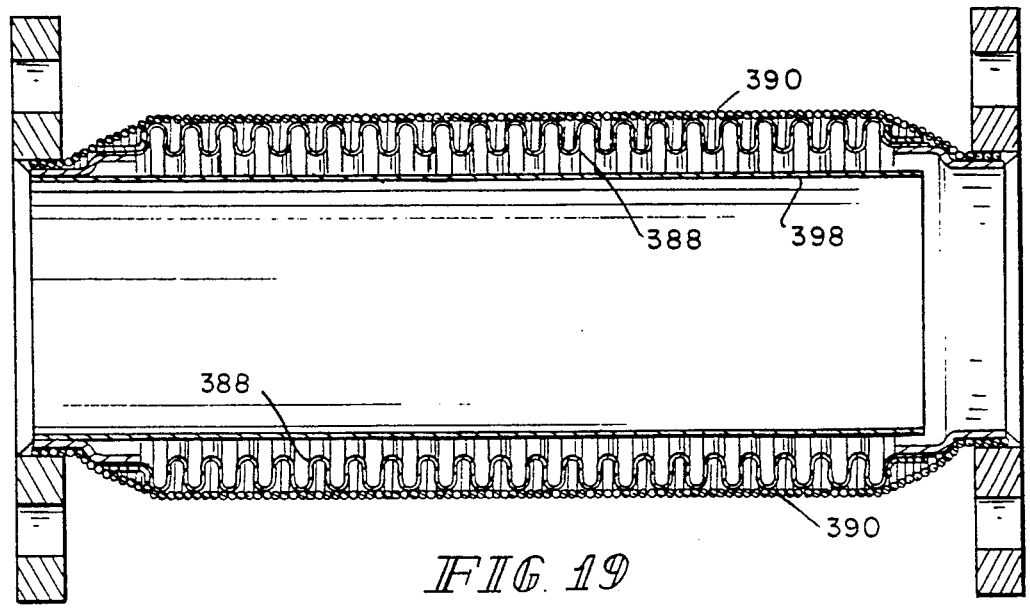
FIG. 19 is a sectional view similar to FIG. 18 showing another embodiment of an expansion joint of an internal thin-walled pipe.

In the embodiment shown in FIG. 19, the thin-walled pipe 16 is made from only one thin-walled pipe 398 held in place at the inlet end. The pipe 318 stops short of the outlet end so it can thermally expand and allow for bending of the flex joint. This arrangement also resists flow of combustion product into the gap between the bellows 388 and the pipe 318 since the combustion product flow would have to reverse direction to enter the gap.

Although the invention has been described in detail with reference to certain preferred embodiments, variations and modifications exist within the scope and spirit of the invention as described and defined in the following claims.

We claim:

1. An apparatus for delivering combustion product from an engine to an exhaust processor, the exhaust processor having an inlet and a predetermined minimum operating temperature, the apparatus comprising a thin-walled pipe conducting hot combustion product from the engine to the inlet of the exhaust processor and having a thermal capacitance per unit length per unit diameter of less than 12,200 $J/m^2 \cdot K$ to minimize the elapsed time during a cold start cycle of the engine until the inlet of the exhaust processor is heated by the combustion product to reach its predetermined minimum operating temperature, the thin-walled pipe including a plurality of serially connected pipe sections and means for slidably coupling adjacent pipe sections to one another to permit relative movement therebetween during thermal expansion of the pipe sections.

2. The apparatus of claim 1, wherein the thin-walled pipe includes a tubular side wall having a wall thickness of less than 1.10 mm (0.043 inch).

3. The apparatus of claim 1, wherein the thin-walled pipe is made of stainless steel.

4. The apparatus of claim 1, further comprising a hollow outer shell extending between the engine and the inlet of the exhaust processor and around the thin-walled pipe and means for supporting the thin-walled pipe inside the hollow outer shell so that the outer shell provides a protective shield and structural support extending along and around the thin-walled pipe.

5. The apparatus of claim 4, wherein the supporting means includes a plurality of stand-off members appended to the hollow outer shell and formed to include means for slidably holding the serially connected pipe sections in axially centered positions in the hollow outer shell during relative movement between the serially connected pipe sections and the hollow outer shell so that the thin-walled pipe is supported for movement relative to the hollow outer shell to allow for differential thermal expansion of the thin-walled pipe and the hollow outer shell resulting from exposure to hot combustion product.

6. An apparatus for delivering combustion product from an engine to an exhaust processor, the exhaust processor having an inlet and a predetermined minimum operating temperature, the apparatus comprising a thin-walled pipe conducting hot combustion product from the engine to the inlet of the exhaust processor and having a thermal capacitance per unit length per unit diameter of less than 12,200 $J/m^2 \cdot K$ to minimize the elapsed time during a cold start cycle of the engine until the inlet of the exhaust processor is heated by the combustion product to reach its predetermined minimum operating temperature, a hollow outer shell around the thin-walled pipe, and means for supporting the thin-walled pipe inside the hollow outer shell in spaced-apart relation to the hollow outer shell to establish an annular air gap therebetween so that thermal transfer between the thin-walled pipe and the hollow outer shell is minimized.

7. The apparatus of claim 6, wherein supporting means includes a plurality of spaced-apart protrusions appended to the hollow outer shell and arranged to engage the thin-walled pipe.

8. An apparatus for delivering combustion product from an engine to an exhaust processor, the exhaust processor having an inlet and a predetermined minimum operating temperature, the apparatus comprising
a thin-walled pipe conducting hot combustion product from the engine to the inlet of the exhaust processor and having a thermal capacitance per unit length per unit diameter of less than 12,200 $J/m^2 \cdot K$ to minimize the elapsed time during a cold start cycle of the engine until the inlet of the exhaust processor is heated by the combustion product to reach its predetermined minimum operating temperature, the thin-walled pipe including a tubular side wall having a wall thickness of less than 1.10 mm (0.043 inch), and
a hollow outer shell extending between the engine and the inlet of the exhaust processor and around the thin-walled pipe, the hollow outer shell including an annular side wall extending along and around the tubular side wall of the thin-walled pipe and having a wall thickness of more than 1.10 mm (0.043 inch).

9. The apparatus of claim 8, further comprising means for supporting the thin-walled pipe inside the hollow outer shell so that the tubular side wall of the thin-walled pipe lies in spaced-apart relation to the annular side wall of the hollow outer shell to define an annular air gap between the thin-walled pipe and the hollow outer shell.

10. The apparatus of claim 9, wherein the supporting means includes a plurality of spaced-apart protrusions appended in the annular side wall of the hollow outer shell and arranged to engage an exterior annular side wall of the thin-walled pipe.

11. An apparatus for delivering combustion product from an engine to an exhaust processor, the apparatus comprising
a thin-walled pipe formed to include a passageway conducting hot combustion product from the engine to the exhaust processor,
a hollow outer shell extending between the engine and the exhaust processor and around the thin-walled pipe, and
means for supporting the thin-walled pipe inside the hollow outer shell so that the outer shell provides a protective shield and structural support extending along and surrounding the thin-walled pipe, the thin-walled pipe including a tubular side wall having a wall thickness of less than 1.10 mm (0.042 inch), the hollow outer shell including an annular side wall extending along and around the tubular side wall of the thin-walled pipe and the annular side wall has a wall thickness of more than 1.10 mm (0.043 inch).

12. The apparatus of claim 11, wherein the supporting means includes a plurality of stand-off members appended to the annular side wall and arranged to support the tubular side wall in spaced-apart relation to the annular side wall to define an annular air gap between the thin-walled pipe and the hollow outer shell.

13. The apparatus of claim 11, wherein the supporting means includes a plurality of stand-off members appended to the annular side wall and formed to include means for slidably holding the thin-walled pipe in an axially centered position in the hollow outer shell during relative movement between the thin-walled pipe and the hollow outer shell so that the thin-walled pipe is supported for movement relative to the hollow outer shell to allow for differential thermal expansion of the thin-walled pipe and the hollow outer shell resulting from exposure to hot combustion product.

14. An apparatus for delivering combustion product from an engine to an exhaust processor, the apparatus comprising
pipe means for providing a first passageway connecting the engine to the exhaust processor, and
means for conducting hot combustion product from the engine to the exhaust processor through a separate second passageway extending through the first passageway, the conducting means including a thin-walled pipe liner forming the second passageway and having a thermal capacitance per unit length per unit diameter of less than 12,200 $J/m^2 \cdot K$ to minimize the dissipation of heat energy from the hot combustion product through the wall of the pipe liner as it travels between the engine and the exhaust processor, the pipe means including an exhaust manifold coupled to the engine and formed to include a first portion of the first passageway and an outer pipe coupled to the exhaust manifold and the exhaust processor and formed to include a second portion of the first passageway, the thin-walled pipe liner being positioned to lie inside the exhaust manifold and the outer pipe to extend through the first and second portions of the first passageway.

15. The apparatus of claim 14, wherein the thin-walled pipe liner includes a tubular side wall having a wall thickness of less than 1.10 mm (0.043 inch).

16. The apparatus of claim 14, wherein the thin-walled pipe liner is made of 439 stainless steel.

17. The assembly of claim 14, wherein the engine includes a plurality of cylinders, the exhaust manifold includes a first manifold section including a plurality of first branch means for conducting combustion product from a first set of cylinders in the engine into the first passageway, a second manifold section including a plurality of second branch means for conducting combustion product from a second set of cylinders in the engine into the first passageway, and means for joining the first and second manifold sections to the outer pipe, and the thin-walled pipe liner extends through each of the first and second branch means.

18. An apparatus for delivering combustion product from an engine to an exhaust processor, the apparatus comprising
pipe means for providing a first passageway connecting the engine to the exhaust processor, and
means for conducting hot combustion product from the engine to the exhaust processor through a separate second passageway extending through the first passageway, the conducting means including a thin-walled pipe liner forming the second passageway and having a thermal capacitance per unit length per unit diameter of less than 12,200 $J/m^2 \cdot K$ to minimize the dissipation of heat energy from the hot combustion product through the wall of the pipe liner as it travels between the engine and the exhaust processor, the pipe means including an inner side wall defining the first passageway and means for supporting the thin-walled pipe liner in the first passageway in spaced-apart relation to the inner side wall to form an annular air gap between the inner side wall and the thin-walled pipe liner, the supporting means including a plurality of stand-off members appended to the inner side wall and arranged to lie around the thin-walled pipe liner.

19. An apparatus for delivering combustion product from an engine to an exhaust processor, the apparatus comprising pipe means for providing a first passageway connecting the engine to the exhaust processor, and means for conducting hot combustion product from the engine to the exhaust processor through a separate second passageway extending through the first passageway, the conducting means including a thin-walled pipe liner forming the second passageway and having a thermal capacitance per unit length per unit diameter of less than 12,200 $J/m^2 \cdot K$ to minimize the dissipation of heat energy from the hot combustion product through the wall of the pipe liner as it travels between the engine and the exhaust processor, the pipe means including an inner side wall defining the first passageway and means for supporting the thin-walled pipe liner in the first passageway in spaced-apart relation to the inner side wall to form an annular air gap between the inner side wall and the thin-walled pipe liner, the pipe means including a hollow exhaust manifold coupled to the engine and a hollow outer pipe coupled to the hollow exhaust manifold and the exhaust process, the thin-walled pipe liner being positioned to extend through the hollow exhaust manifold and outer pipe, and the supporting means being located to support the thin-walled pipe liner to define an annular air gap around the thin-walled pipe liner in each of the hollow exhaust manifold and outer pipe.

20. An apparatus for delivering combustion product from an engine to an exhaust processor, the apparatus comprising pipe means for providing a first passageway connecting the engine to the exhaust processor, and means for conducting hot combustion product from the engine to the exhaust processor through a separate second passageway extending through the first passageway, the conducting means including a thin-walled pipe liner forming the second passageway and having a thermal capacitance per unit length per unit diameter of less than 12,200 $J/m^2 \cdot K$ to minimize the dissipation of heat energy from the hot combustion product through the wall of the pipe liner as it travels between the engine and the exhaust processor, the pipe means including means for providing support for the thin-walled pipe liner in the first passageway and an insulating air gap around the thin-walled pipe liner, the pipe means including an exhaust manifold coupled to the engine and formed to include a portion of the first passageway containing the thin-walled pipe liner.

21. The assembly of claim 20, wherein the pipe means includes an outer pipe coupled to the exhaust processor and formed to include a portion of the first passageway containing the thin-walled pipe liner.

* * * * *